(12) United States Patent
Alberti et al.

(10) Patent No.: US 7,144,652 B2
(45) Date of Patent: Dec. 5, 2006

(54) MEMBRANE-ELECTRODE ASSEMBLY FOR POLYMERIC MEMBRANE FUEL CELL

(75) Inventors: Giulio Alberti, Perugia (IT); Mario Casciola, Perugia (IT); Enrico Ramunni, San Donato M.se (IT); Rubén Ornelas Jacobo, San Giuliano M.se (IT)

(73) Assignee: Nuvera Fuel Cells Europe S.r.l. de Nora Electrodi S.p.A. (IT)

( * ) Notice: Subject to any disclaimer, the term of this patent is extended or adjusted under 35 U.S.C. 154(b) by 238 days.

(21) Appl. No.: 10/011,458

(22) Filed: Oct. 22, 2001

(65) Prior Publication Data

US 2002/0058173 A1  May 16, 2002

(30) Foreign Application Priority Data

Nov. 14, 2000  (IT) .......................... MI2000A2443

(51) Int. Cl.
  *H01M 4/86*  (2006.01)
(52) U.S. Cl. ............................ 429/41; 429/42; 429/44; 204/296
(58) Field of Classification Search ............ 429/40–44, 429/30; 204/296
  See application file for complete search history.

(56) References Cited

U.S. PATENT DOCUMENTS

| | | | | | |
|---|---|---|---|---|---|
| 4,467,019 | A | * | 8/1984 | Feigenbaum | 429/34 |
| 5,262,250 | A | * | 11/1993 | Watanabe | 429/33 |
| 5,766,787 | A | * | 6/1998 | Watanabe et al. | 429/33 |
| 6,059,943 | A | * | 5/2000 | Murphy et al. | 204/296 |
| 6,465,136 | B1 | * | 10/2002 | Fenton et al. | 429/309 |

* cited by examiner

*Primary Examiner*—Tracy Dove
(74) *Attorney, Agent, or Firm*—Charles A. Muserlian

(57) ABSTRACT

The invention is relative to a membrane-electrode assembly for fuel cells, comprising a state of the art ion-exchange polymeric membrane and state of the art gas diffusion electrodes, whose electrochemical properties are modified through the addition of a hydrophilic component localized in correspondence to one or both the electrodic interfaces and/or one or both the external surfaces of the membrane. The modified membrane-electrode assembly is characterized by high protonic conductivity and high efficiency even in the presence of small quantities of carbon monoxide, or of other contaminants contained in the fuel, even at temperatures as low as 100° C., being also suitable for medium temperature (100–160° C.) operation at relative humidity level lower than saturation.

22 Claims, No Drawings

MEMBRANE-ELECTRODE ASSEMBLY FOR POLYMERIC MEMBRANE FUEL CELL

BACKGROUND OF THE INVENTION

Fuel cells are devices in which the free energy of reaction released by the combination of a fuel (e.g. hydrogen, hydrogen-containing mixtures, alcohols, hydrocarbons) with an oxidant (e.g. pure oxygen or air) is not completely degraded to thermal energy, being converted instead to electric energy in the form of direct current. In such devices, the fuel is supplied at the anode, which assumes negative polarity, and the oxidant is supplied at the cathode, which conversely assumes positive polarity.

The generation of electric energy in fuel cells is of extreme interest in view of the high efficiency of utilisation of the fuels employed—as the process is not subject to the limitations of Carnot's cycle—and for the scarce environmental impact, in terms of noxious emissions and noise. When pure hydrogen is chosen as the fuel, such environmental impact virtually nought.

Fuel cells can be schematically classified in different types, essentially characterised by the type of electrolyte which separates the anodic and the cathodic compartment, and consequently by the temperature range in which they can be typically operated; this type of classification directly reflects on the effective or prospective utilisation of these systems. In particular, fuel cells that operate at high temperature, that is above 200° C., are already established as an alternative source of electric energy in big size power plants, also due to the attractive possibilities of co-generation allowed by the high thermal level. On the other hand, the kind of cells that appears more interesting in the field of small and medium size electric generation, both for stationary and for mobile (e.g. automotive) applications utilises a protonic conduction membrane as the electrolyte. It is known in the art that fuel cells utilising such membranes cannot be operated at temperature close to or higher than 100° C. as a strong decline in the protonic conductivity due to the difficulty of maintaining a high level of hydration occurs. For such reason, fuel cells utilising a polymeric membrane as the electrolyte are traditionally operated at a maximum temperature of 70–80° C. The high energy and power density associated to the utilisation of solid polymeric electrolytes and the rapidity in starting up and bringing to regime conditions the fuel cells employing the same, make the membrane fuel cells much more competitive of any contender for such type of applications. The limitation in the presently allowed thermal level nevertheless constitutes an important limitation to the full market affirmation of fuel cells employing commercial ion-exchange membranes: the possibility of operating at temperatures higher than 100° C. would in fact result in a mitigation of the requirements of the heat withdrawal circuits (a very important prerogative especially in applications of the automotive type), and in the possibility of improving the overall energetic yield by co-generation. Furthermore, the limitations given by the lack of flexibility in the fuel than can be supplied at temperatures below 100° C. must be taken into account. The availability of pure hydrogen is in fact limited to a selected niche of applications in which such fuel is present as a by-product, as in the case of sodium chloride electrolysis plant. In the case, for instance, in which hydrogen comes from the conversion of natural gas, alcohol or fossil fuels, the problem represented by the inevitable presence of carbon monoxide, simple traces of which are sufficient to sensibly penalise the functioning of the presently known anodic catalysts at the commonly employed temperatures, is well known. The fuel purification systems of practical application do not allow a decrease of the content of CO in the fuel below 10 parts per million (ppm); besides being very burdensome process-wise, going beyond such limit would have no practical meaning: actually, the carbon dioxide which constitutes, together with hydrogen, the product of the reactions of conversion of primary fuels (partial oxidation or steam reforming), coming in contact with the anodic catalyst of the fuel cell would in its turn form carbon monoxide in concentrations of that order of magnitude, being in chemical equilibrium therewith. 10 ppm of CO are largely sufficient to poison the commercially available platinum-based anodic catalysts to a significant extent. As the reaction of formation of the Pt-CO abduct is exothermal, the poisoning of the current platinum-based catalysts upon exposition to very small amounts of carbon monoxide may be virtually eliminated by increasing the operating temperature above 130° C. More sophisticated catalysts, for instance those based on platinum-ruthenium or platinum-molybdenum alloys, show an almost complete tolerance to such poisoning phenomena even at lower temperatures, for instance at 110° C. The commercial fuel cell membranes really developed to such an extent as to allow their effective use in industrial applications are made of perfluorocarbonsulphonic acids (for example Nafion®), for which the possibility of operating beyond 100° C. is seriously hindered, as said above, by the drastic decrease of protonic conductivity in the operating conditions. On the basis of protonic conductivity measurements carried out on such membranes in the range of 100–160° C. and at different conditions of relative humidity it has been determined that the decrease of protonic conductivity in fuel cells must essentially be related to the difficulty of maintaining the water balance of the system, especially when operating with gaseous reactants at low pressure (which is the inevitable case for the majority of practical applications to maximise the system efficiency). The above holds true also for other types of membranes proposed as an alternative to the perfluorocarbonsulphonic ones such as, for instance, those based on the sulphonation of polybenzimidazol (PBI), polyethersulphone (PES), or polymers of the family of polyetherketones (PEK and similar). Such membranes, though having a glass transition temperature higher than Nafion, and consequently a higher tolerance to high temperatures, require a very high water supply for their functioning, burdening the fuel cell operating conditions significantly; for instance, the sulphonated polyetheretherketone's (PEEK) based membranes, which are the closest to commercialisation among those cited due to their excellent chemical and mechanical properties, develop a sufficient ionic conductivity only when the relative humidity is higher than 95%. An improvement of the humidification conditions of perfluorocarbonsulphonic membranes has been proposed in the U.S. Pat. No. 5,523,181: in the case of fuel cells operating on hydrogen and oxygen or hydrogen and air, the dispersion of very fine particles of silica gel within the relevant polymers helps maintaining the water balance, allowing the operation of fuel cells either with a reduced external supply of humidity in the gaseous reactant flow or, in the most favourable cases, even without any water supply, that is relying on the sole product water. Such an improvement, although not allowing per se the operation of fuel cells above 100° C., mitigates to some extent the aforementioned dehydration phenomena. A further improvement of this concept is disclosed in the European patent application EP 0 926 754, wherein an appropriate thermal treatment effected on a membrane modified according to the teaching of U.S. Pat. No. 5,523,181 permits the operation at a temperature close to 150° C. Nevertheless, the modification of perfluorocarbonsulphonic membranes with silica presents some drawbacks: the insertion of a non conductive component through the whole thickness of the polymeric membrane may negatively affect the electrical efficiency of the whole system. Moreover, the method of production of the membranes is substantially altered and complicated: whereas, in the current industrial production, the membrane is extruded from the perfluorocarbonsulphonic acid having the functional groups in fluorosulphonic form and eventually hydrolysed, which allows a continuous cycle operation, when silica has to be embedded it is necessary to start from the ionomer in aqueous solution or suspension, for instance dissolving the prehydrolysed perfluorocarbonsulphonic acid at high pressure and temperature, mixing it with silica gel, and then depositing the membrane from the liquid phase. EP 0 926 754 discloses, for instance, the preparation of membrane samples by means of a Petri disk, that is with a method which cannot be scaled up to the industrial level. Besides this, to be able to operate at high temperature in stable conditions it is necessary to carry out an auxiliary thermal treatment beyond the glass transition temperature, controlling the process with an online diffractometer, that is through a further phase of difficult industrial operability.

It has thus been identified, with respect to the current state of the art, the need of a new invention allowing to operate the current polymeric membrane fuel cells at a temperature close to or higher than 100° C. (for instance in the range of 90–160° C.) without having to modify the currently commercially available membranes, preferably with a water supply requirement in the system substantially below the saturation level of the gaseous reactants.

It has further been identified the need of a means for operating a fuel cell in the presence of significant impurities present in the fuel (for instance, carbon monoxide in the order of tens of ppm) without giving rise to phenomena of poisoning or deactivation of the catalysts commercially available, even at temperatures close to 100° C.

It is an object of the present invention to provide a membrane-electrode assembly for polymeric membrane fuel cells capable of overcoming at least some drawbacks of the prior art.

According to one aspect, it is an object of the present invention to provide a membrane-electrode assembly for polymeric membrane fuel cells characterised by high protonic conductivity and high efficiency in conditions of reduced relative humidity of the reactants with respect to saturation, optionally in the presence of small amounts of carbon monoxide or other contaminants present in the fuel, and a method of production thereof.

According to another aspect, it is an object of the present invention to provide a gas diffusion electrode which allows operation of a state of the art membrane in conditions of reduced relative humidity of the reactants with respect to saturation, optionally in the presence of small amounts of carbon monoxide or other contaminants present in the fuel.

According to another aspect, it is an object of the present invention to provide a method of operation of a polymeric membrane fuel cell in conditions of reduced relative humidity of the reactants with respect to saturation, optionally in the presence of small amounts of carbon monoxide or other contaminants present in the fuel.

These and other objectives will be further clarified from the following description and examples.

SUMMARY OF THE INVENTION

In accordance with the invention there is provided a membrane-electrode assembly for polymeric membrane fuel cells comprising one ion-exchange membrane in intimate contact with at least one gas diffusion electrode, and at least one hydrophilic component, localised in correspondence of at least one contact interface between ion-exchange membrane and gas diffusion electrode. In a preferred arrangement, each of the two main surfaces of the ion-exchange membrane are in intimate contact with a gas diffusion electrode, and at least one hydrophilic component is localised in correspondence of each of the two resulting interfaces.

In a preferred arrangement, the hydrophilic component may be constituted of silica gel, according to what described in U.S. Pat. No. 5,523,181 and in the publication EP 0 926 754, or more preferably by a solid protonic conductor, for instance by a lamellar zirconium phosphate or phosphonate, by phosphomolybdic, phosphotungstic, silicotungstic acid or by other equivalent components of the state of the art.

In accordance with the invention there is also provided a modified gas diffusion electrode having a catalysed surface coated with an ionomeric film having at least one hydrophilic component added thereto.

In accordance with the invention there is also provided a method for producing the membrane-electrode assembly of the invention, comprising contacting one ion-exchange membrane with at least one gas diffusion electrode after depositing a film of ionomer with at least one hydrophilic component added thereto on the surface of the ion-exchange membrane or more preferably of the gas diffusion electrode.

In accordance with the invention there is also provided a method for operating a polymeric membrane fuel cell in a temperature range of 70–160° C. making use of reactants having a relative humidity below the saturation.

In accordance with the invention there is also provided a method for operating a polymeric membrane fuel cell in the presence of traces of contaminants.

DESCRIPTION OF THE INVENTION

In accordance with the invention there is provided a membrane-electrode assembly for polymeric membrane fuel cells comprising one ion-exchange membrane in intimate contact with at least one gas diffusion electrode thereby defining at least one interface, in correspondence of which at least one hydrophilic component is added.

It has been surprisingly found that the addition of a hydrophilic component such as silica gel, according to the teaching of the prior art, results almost exclusively useful in the outermost portions of the membrane, i.e. those contacting the gas diffusion electrodes. Such hydrophilic component, characterised by a protonic conductivity much lower than the one of the polymer if any, brings no benefit in the inner portion of the membrane, conversely decreasing the ionic conductivity thereof and negatively affecting the overall electric efficiency of the system. Better results than those of the cited state of the art can be obtained through the employment of an asymmetrical membrane, containing silica gel or another hydrophilic additive in correspondence of only one or of both of the external surfaces of the membrane, through a small thickness, for instance comprised between 1 and 10 micrometers, with no additive present in the bulk.

In case the hydrophilic additive is deposited on just one surface, it is preferable that the latter is the one contacting the anode, which tends to a greater extent to be interested by dehydration phenomena during cell operation. The cathodic surface, in fact, in the one whereupon product water is formed during the process; moreover, the electric current inside the membrane is sustained by a flow of protons that migrate from the anode toward the cathode, carrying with them the corresponding water constituting the hydration sphere, thereby subtracting water from the anodic interface. The consequent dehydration of such region causes a sensible decrease of the protonic conductivity of the whole membrane-electrode system. In other words, it has been found that, whereas in the absence of electric current the protonic conductivity of the main proton-exchange membranes known in the art is sufficiently high even at temperature above 100° C. and also in the presence of relative humidity substantially lower than 100%, sometimes as low as 50%, during the operation of the fuel cell at high current density a fast anodic kinetic of reaction requires the protons generated at the corresponding interface to be in contact with the highest possible concentration of water, ideally close to 100% relative humidity, so that they can be rapidly hydrated. Moreover it has been surprisingly found that a substantial benefit may be obtained also with a hydrophilic additive at the cathodic interface. Although no positive explanation has been determined so far, it may be supposed that in this case the additive facilitates the migration of the water generated at the cathode, thereby avoiding an excessive accumulation thereof at the Pt/polymer interface and favouring its back-diffusion towards the anodic region.

It has been finally found that the addition of appropriate hydrophilic compounds in correspondence of the anodic interface imparts unexpected tolerance characteristics towards small but significant amounts of carbon monoxide in the fuel, at temperatures at which, in the absence of such agents, severe poisoning of the anodic catalyst occurs. Without wishing the present invention to be bound to any particular theory, it can be supposed that an extremely high concentration of water on the catalytic particles shifts the reversible reaction $CO+H_2O \rightarrow CO_2+H_2$ to the right, thereby locally decreasing the concentration of carbon monoxide below the threshold of poisoning.

As said above, the membrane-electrode assembly for fuel cells of the present invention comprises at least one membrane-electrode interface modified by addition of a hydrophilic component. Such modification can be accomplished in at least two different ways:

1) utilising a state of the art proton-exchange membrane and modifying at least one state of the art gas diffusion electrode by adding a hydrophilic component thereto; 2) utilising unmodified state of the art electrodes and modifying a proton-exchange membrane upon addition of a hydrophilic component on one or both the external surfaces of the same.

In the former embodiment, the membrane-electrode assembly may be obtained simply starting with an unmodified commercial membrane; the hydrophilic agent is mixed in an ionomeric suspension or solution, and the resulting dispersion is coated on the catalysed surface of at least one gas diffusion electrode, preferably at least on the catalysed surface of the anode, to be subsequently put in intimate contact with the corresponding surface of the membrane. For instance, it is possible to disperse the hydrophilic agent in an aqueous or hydro-alcoholic suspension of liquid Nafion®. This type of ionomeric suspension, commercialised with slightly different morphologies and solvents by DuPont de Nemours (USA) and Aldrich (Great Britain), is notoriously employed to extend the contact between membrane and catalyst by soaking the catalytic pores of the electrode with a protonic conductive phase, which can be conveniently interfaced, on the other side, to the membrane itself. The ionomeric suspension can be applied by spraying, brushing, rolling or with any other suitable technique. With the described modification, the same means is also employed to contact the catalyst with a hydrophilic agent dispersed in the ionomeric phase, thereby increasing to a relevant extent the local diffusion velocity of water in the membrane-electrode interface, thus alleviating the problems of dehydration thereof at high current density.

The membrane-electrode assembly can be, for instance, pre-formed upon heat-pressing of the electrodes, at least one of which, and preferably the anode, modified as described, to the corresponding faces of the membrane, otherwise the assemblage can be performed in situ after positioning inside the fuel cell upon clamping of the same.

As an alternative, it is possible to prepare one or both of the gas diffusion electrodes by first dispersing the catalyst in the ionomeric phase containing the hydrophilic additive, applying such ionomeric phase comprising the catalyst on a surface suited to for a gas diffusion electrode, for instance a carbon cloth or carbon paper, then contacting the membrane with the resulting catalysed surface, by means of heat-pressing or in situ assemblage as described in the previous case.

According to a further embodiment of the membrane-electrode assembly, the present invention consists in a state of the art proton-exchange membrane, for instance in a Nafion® type perfluorocarbonsulphonic membrane, modified on one or both surface upon addition of a hydrophilic component. Such agent may be applied with a technique similar to the one previously disclosed for the application to the electrodes. For instance, a thin film of the hydrophilic agent-containing suspension, prepared as previously described, can be applied on at least one face of the membrane upon spraying, brushing or rolling, or any other technique suitable for this purpose. After evaporation of the solvent, the surface of the membrane remains covered by a thin layer of hydrophilic agent-containing ionomer. The hydrophilic agent-containing suspension optionally contains a catalyst and/or ionomer, preferably an ionomer of the same chemical nature of the ion-exchange membrane. As an alternative, according to a non preferred procedure, it is possible to operate as follows: the deposition of the membrane is effected on a suitable surface, for instance in a Petri disk, from a precursor in aqueous or hydro-alcoholic suspension, making sure of previously depositing a homogeneous layer of the hydrophilic compound as fine powder or fiber on the bottom of its surface. A second layer can be formed also on the upper face of the membrane making sure to deposit on such face the suspension of the precursor, containing the hydrophilic compound as powder or fiber. By acting on the density of the suspension, it is to a large extent possible to avoid mixing and migration of the hydrophilic compound toward the bulk of the polymer. The hydrophilic compound may be constituted of silica gel, but the disclosed method is naturally applicable to equivalent cases in which one or more diverse hydrophilic compound of different nature, either organic or inorganic, are applied. On the hydrophilic agent-modified membrane the gas-diffusion electrodes are subsequently applied according to the previously indicated procedures.

In any of the disclosed embodiments, the hydrophilic compound is preferably a protonic conductor, for instance, vanadyl phosphate, a phosphate, phosphonate or organic phosphate of a bivalent, trivalent, tetravalent or pentavalent metal such as zirconium, titanium, tin or antimony, or an inorganic heteropolyacid, for instance phosphoantimonic, phosphomolybdic or phosphotungstic acid. The disclosed compounds of phosphorus are known to develop a good ionic conductivity even at low temperature; in general, any hydrophilic compound that is also a protonic conductor in the temperature conditions foreseen for the operation in a polymeric membrane fuel cell (e.g. between 70 and 160° C.) is to be considered as suitable for the described preferred embodiment of the invention.

The following examples have the purpose of facilitating the understanding of the invention, and do not intend to limit in any manner its scope, which is solely defined by the appended claims.

EXAMPLE 1

A gas diffusion electrode of the type commercialised under the trade-mark ELAT™ by De Nora North America (USA), made of a carbon cloth activated on one face with 0.5 mg/cm² of a platinum supported on active carbon catalyst, was brushed with 5% by weight liquid Nafion® in hydroalcoholic suspension, commercialised by Solution Technology, in which 30% with respect to the weight of suspended Nafion® of an aqueous dispersion of silica gel (Ludox) had been previously dispersed.

0.8 mg/cm² of modified ionomer were so applied, as detected by weighing after solvent evaporation; the electrode was assembled as the anode on one side of a Nafion® 115 membrane, commercialised by DuPont de Nemours, while an equivalent ELAT™ brushed with 0.65 mg/cm² of unmodified Nafion® was employed as the cathode. The membrane-electrode assembly so obtained was characterised for four hours in a fuel cell fed with pure hydrogen at the anode and air at the cathode, both at an absolute pressure of 3.5 atm and pre-humidified at 70% relative humidity. The operating temperature was maintained at 95° C. After the first hour of operation, during which the performances of the membrane-electrode assembly, expressed in terms of cell voltage at constant current density (1 A/cm²) tended to progressively rise, the same became stable at a cell voltage value of 620 mV.

The same test was repeated supplying at the anode a mixture coming from partial oxidation of natural gas after catalytic purification, containing 45% hydrogen, 15% carbon dioxide, 1% methane and 11 ppm of CO (balance nitrogen). In these conditions, a cell voltage of 540 mV at 0.6 A/cm² was detected.

REFERENCE EXAMPLE 1

The tests of Example 1 were repeated utilising a Nafion® based membrane modified with silica gel and submitted to a thermal treatment, according to the disclosure of EP 0 926 754, coupled to two gas diffusion electrodes equivalent to the cathode of Example 1.

At the same process conditions of Example 1, with pure hydrogen at a current density of 1 A/cm², the cell voltage stabilised after about one hour at 580 mV, while with the hydrogen mixture from partial oxidation a cell voltage of 330 mV at 0.6 A/cm² was detected.

REFERENCE EXAMPLE 2

The tests of Example 1 were repeated with the same membrane, but utilising the cathode of Example 1 both as the anode and as the cathode.

At the same process conditions of Example 1, with pure hydrogen at a current density of 1 A/cm², the cell voltage stabilised after about one hour at 490 mV; after a further hour of operation, however, the cell voltage tended to decline progressively, until reaching, after four hours of operation, the value of 400 mV; upon increasing the relative humidity of the reactants until saturation, the cell voltage reached a value of 570 mV. With the hydrogen mixture from partial oxidation, it was not possible to operate at current density above 0.2 A/cm² at any value of relative humidity.

EXAMPLE 2

The tests of Example 1 were repeated with an anodic catalyst based on Pt.Ru alloy in 1:1 atomic ratio, keeping the remaining parameters constant. The anode had been soaked with the silica gel modified ionomeric suspension according to the invention.

Operating with pure hydrogen at 1 A/cm², a cell voltage of 580 mV was detected; with the hydrogen mixture from partial oxidation, a cell voltage of 540 mV at 0.6 A/cm² was observed.

EXAMPLE 3

The test on pure hydrogen of Example 1 was repeated, making use of the same electrodes, in particular of the anode brushed as disclosed in the Example 1, and with an experimental sulphonated PEEK-based membrane. Operating with 70% relative humidity at 1 A/cm², a cell voltage of 660 mV was observed; upon increasing the relative humidity until saturation, this value rose to 690 mV.

REFERENCE EXAMPLE 3

The test of Example 3 was repeated making use of the same electrodes of Reference Example 2. Operating at 70% relative humidity, it was not possible to raise the current density beyond 0.4 A/cm²; upon increasing the relative humidity to saturation, it was possible to operate at 1 A/cm² with a cell voltage of 640 mV.

EXAMPLE 4

The tests of Example 1 were repeated at a cell temperature of 110° C. In such conditions, at a current density of 1 A/cm² with pure hydrogen, a cell voltage of 560 mV was detected. Operating with the mixture coming from natural gas partial oxidation, a cell voltage of 630 mV was detected at 0.6 A/cm².

REFERENCE EXAMPLE 4

The tests of Reference Example 2 were repeated at 110° C.; it was not possible to obtain any current generation in the specified conditions.

EXAMPLE 5

The tests of Example 2 were repeated at a temperature of 110° C., with 90% relative humidity. Operating with pure hydrogen at 1 A/cm², a cell voltage of 520 mV could be detected. Also with the hydrogen mixture coming form partial oxidation it was possible, in this case, to operate the cell at the same current density, with a very similar voltage (500 mV); the voltage decrease upon switching from pure hydrogen to mixture is the one expected for a plain dilution, while the CO poisoning effect is practically absent.

EXAMPLE 6

The tests of Example 4 were repeated at a temperature of 130° C., utilising an anode soaked with a liquid Nafion suspension modified with 30% by weight of amorphous $Zr(HPO_4)_{0.5}(O_3PC_6H_4SO_3H)_{1.5} \cdot nH_2O$ (zirconium phosphate sulphophenylphosphonate).

In these conditions, operating with pure hydrogen at 1 A/cm$^2$, a cell voltage of 470 mV could be detected. Also with hydrogen mixture coming from partial oxidation it was now possible to operate the cell at the same current density, with a very similar voltage (460 mV); the voltage decrease upon switching from pure hydrogen to mixture is the one expected for a plain dilution phenomenon, while the CO poisoning effect is virtually absent.

While there has been described what are believed to be the preferred embodiments of the present invention, those skill in the art will recognise that other and further changes and modifications may be made thereto without departing from the spirit of the invention, and it is intended to claim all such changes and modification as fall within the true scope of the invention.

Throughout the description and claims of this specification, the word "comprise" and variations thereof such as "comprising" and "comprises", is not intended to exclude other additives, components, integers or steps.

The invention claimed is:

1. A membrane-electrode assembly comprising at least one ion-exchange membrane in contact with at least one porous gas diffusion electrode having an ionomer layer soaked in the pores of the electrode, said ionomer layer having at least one hydrophilic component dispersed therein.

2. The membrane-electrode assembly of claim 1 wherein said at least one hydrophilic component is in the form of a powder or fibers.

3. The membrane-electrode assembly of claim 1 wherein said at least one hydrophilic component is constituted by silica.

4. The membrane-electrode assembly of claim 1 wherein said at least one bydrophilic component is a protonic conductor.

5. The membrane-electrode assembly of claim 4 wherein said protonic conductor is a compound of phosphorus.

6. The membrane-electrode assembly of claim 5 wherein said protonic conductor is selected from the group consisting of phosphates, phosphonates and organic phosphates of tetravalent, trivalent and bivalent metals.

7. The membrane-electrode assembly of claim 6 wherein said protonic conductor is a solid having lamellar structure.

8. The membrane-electrode assembly of claim 4 wherein said protonic conductor is a heteropolyacid.

9. The membrane-electrode assembly of claim 8 wherein said heteropolyacid is selected from the group consisting of phosphoantiomonic, phosphotungstic, silicotungstic and phosphomolybdic acid.

10. The membrane-electrode assembly of claim 1 wherein said hydrophilic component is previously dispersed in an ionomeric suspension or solution.

11. The membrane-electrode assembly of claim 10 wherein said ionomeric suspension or solution is an aqueous or hydroalcoholic suspension or solution of a fluorocarbonsulfonic acid.

12. A porous gas diffusion electrode having a catalyzed surface coated with an ionomeric film soaked in the pores of the electrode, the ionomeric film obtained from an ionomeric suspension or solution having at least one hydrophilic component.

13. The gas diffusion electrode of claim 12, wherein said hydrophilic component is in the form of a powder or fibers.

14. The gas diffusion electrode of claim 12 wherein said at least one hydrophilic component is silica.

15. The gas diffusion electrode of claim 12 wherein said at least one hydrophilic component is a protonic conductor.

16. The gas diffusion electrode of claim 15, wherein said protonic conductor is a compound of phosphorus.

17. The gas difThsion electrode of claim 16, wherein said protonic conductor is selected from the group consisting of phosphate, phosphonates and organic phosphates of tetravalent, trivalent and bivalent metals.

18. The gas diffusion electrode of claim 17, wherein said protonic conductor is a solid having lamellar structure.

19. The gas diffusion electrode of claim 15, wherein said protonic conductor is a heteropolyacid.

20. The gas diffusion electrode of claim 19, wherein said heteropolyacid is selected from the group consisting of phosphoantiomonic, phosphotungstic, silicotungstic and phosphomolybdic acid.

21. The gas diffusion electrode of claim 12 wherein said ionomeric film comprises a fluorocarbonsulfonic acid.

22. The membrane-electrode assembly of claim 1 wherein said ion-exchange membrane comprises a sulfonated polymer selected from the group consisting of perfluorocarbonsulfonic acids, sulfonated polybenzimidazole, sulfonated polyethersulfone and sulfonated polyetherketones.

* * * * *